United States Patent [19]

Jung

[11] Patent Number: 5,740,917
[45] Date of Patent: Apr. 21, 1998

[54] BOUNDARY LAYER CONDENSATE DRAIN POT

[76] Inventor: Douglas B. Jung, 3209 Franz Valley Rd., Santa Rosa, Calif. 95404

[21] Appl. No.: 581,900

[22] Filed: Jan. 2, 1996

[51] Int. Cl.[6] .................................................. B03D 5/66
[52] U.S. Cl. .......................... 209/156; 209/135; 209/143; 165/104.26; 138/37
[58] Field of Search ............................ 209/156, 135, 209/142, 143, 210; 165/104.26, DIG. 217, DIG. 221–DIG. 223; 138/37, 39

[56] References Cited

U.S. PATENT DOCUMENTS

| 56,905 | 8/1866 | Copelend | 138/37 |
| 2,795,373 | 6/1957 | Hewson | 138/39 |
| 3,117,821 | 1/1964 | Mylting | 138/37 |
| 5,400,908 | 3/1995 | Prestwood | 209/135 |
| 5,460,163 | 10/1995 | Goebel | 165/104.26 |

*Primary Examiner*—William E. Terrell
*Assistant Examiner*—Khoi H. Tran

[57] ABSTRACT

The present invention entails a device for separating liquid and entrained solids from a vapor stream traveling under pressure within a conduit by inducement of the annular boundary layer within the pipe wall, to a stratified region flowing along the bottom of the pipe, for removal by way of a condensate drain pot.

6 Claims, 1 Drawing Sheet

BOUNDARY LAYER CONDENSATE DRAIN POT

BACKGROUND OF THE INVENTION

1. Field of the Invention

The present invention relates to an apparatus useful for separating liquids and/or solids from a fluid stream flowing in a pipeline. It particularly deals with a method of using guide bars attached to the inside of the pipeline to channel the annular liquid and solid build-up on the pipe wall to the collection pot.

2. The Relevant Technology

Drip-pots, condensate pots, condensate drain-pots, drain-boots, pipeline drains, drop-pot, pots, etc. (same device) have been used for over 100 years in vapor systems to remove liquid and solid build-up from a pipeline. They are employed in steam, natural gas, pneumatic, petrochemical vapor systems, etc. These devices are simple drains of varying size and capacity, installed on the bottom of the pipe, allowing gravity to separate the heavier fraction, which then can drop into a deep pot, like an extended tee of various sizes, for removal. In a flowing system, the liquid fraction must be channeling on the bottom of the pipe for effective removal. This flow regime is known as stratified, where the liquid fraction flows along the bottom and the vapor on top.

Condensate pots are inexpensive separators that allow liquids and solids to drop out from the bottom of pipelines. These devices can provide removal efficiencies in excess of 70 percent if the line velocity is relatively low, pot size is moderate to large, with adequate straight runs of pipe to fully developed the velocity profile and allows the liquid drainage to gather onto the very bottom of the pipe. Unfortunately, line velocities are generally too high and/or inadequate lengths of straight runs of pipe prevent the development of a good stratified flow regime. Elbows, tees, crosses, flow meters, probes, expanders, reducers and other obstructions can further fragment the flow and delay the development of a stratified flow regime.

In the geothermal industry, drip-pots are used extensively to drain liquid from steam lines during start-up and to remove carry-over from the primary separator during operation. These large diameter lines to 48 inches or more incorporate pots that are generally poor performers and as a consequence, a final main line polishing separator is employed to supplement these devices. The cost to install drip-pots are relative low and result in pressure loss less than a fraction of a psi (pound per square inch). The total cost to install a final vertical polishing separator can exceed $500,000 apiece and result in pressure drops of 10 psi or greater. Excess pressure loss can significantly reduce steam production resulting in lost power generation.

SUMMARY AND OBJECTS OF THE INVENTION

The boundary layer drip-pot is a state of the art high performance, low pressure drop, low cost separator that uses the pipeline itself as the separator. The concept is simple and elegant: to induce the development from a dispersed or annular flow regime into a stratified component allowing the denser liquid and solid fraction to drop out into a pot located on the bottom of the pipe. Typical drip-pots are limited to inlet velocities between 50 feet per second to 100 feet per second with removal efficiencies to approximately 70 percent. Inlet velocities to 200 feet per second have been encountered on our novel boundary layer drip-pot with removal efficiencies above 90 percent.

Understanding the flow regime to determining when such a system can be employed is important. The key to this patent is in the use of a guide bar or bars to induce a thin annular fluid ring flowing on a conduit wall into a stratified region where the liquid fraction can fall out onto the bottom of the pipe and into a bottom tee-type condensate pot where it may be drained. Normally, it could take up to 100 pipe diameters or more to tranverse from annular or dispersed to a stratified flow regime. It has been found on transition that the liquid can quickly coalesce onto the pipe wall forming an annular layer. With the use of an annular guide ring to channel the liquid ring build-up on the pipe wall, as little as five diameters can accomplish the same results. This simple guide saves pipe, space and the cost of main line separators.

The guide bar can be fabricated from a variety of shapes and materials. Its angle of attack from the horizontal pipeline can be from forty-five degrees to twenty degrees or less, with a typical angle of about 30 degrees. The position of the guide bar can be from the top of the pipe to near mid section of the drip-pot. Normally a space is left open near the top of the pipe where the annular ring is minimal at the top position and the bottom section is left open so that the guided liquid layer can exit off the bottom and into the drain pot.

BRIEF DESCRIPTION OF THE DRAWINGS

The present invention maybe better understood and its advantages will be apparent to those skilled in the art by reference to the accompanying drawings, wherein like reference numerals refer to like elements in the several figures. These drawings represent only typical embodiments of the invention and are not therefore to be considered limiting of its scope.

FIG. 1 is a cut-away side view of a condensate drain pot showing the liquid guide bar and the pot along with optional expanders and reducers.

FIG. 2 shows a end view of the guide bar attached to the interior of the pipe.

DETAILED DESCRIPTION OF THE PREFERRED EMBODIMENTS

The separating apparatus of this invention is especially useful for separating liquid and/or entrained solids from a vapor stream. This device is particularly useful in long, large diameter pipelines where large separating vessels are very expensive. In these situations, when properly sized, our novel devices can be used to replace these vessels at a fraction of the conventional cost. The concept is basically simple, to guide the liquid off the pipe walls to the bottom of the pipe directing the fluid into a drop-pot for removal. The configuration can be straight pipe or a spool of larger diameter pipe according to FIG. 1. It should be noted that there are a multitude of means to guide the liquid. There could be one or multiple bars of varying configurations. The placement of the guides as shown in FIG. 2 can vary and the design of the drain pot itself can be of a variety of styles.

Figure 1:
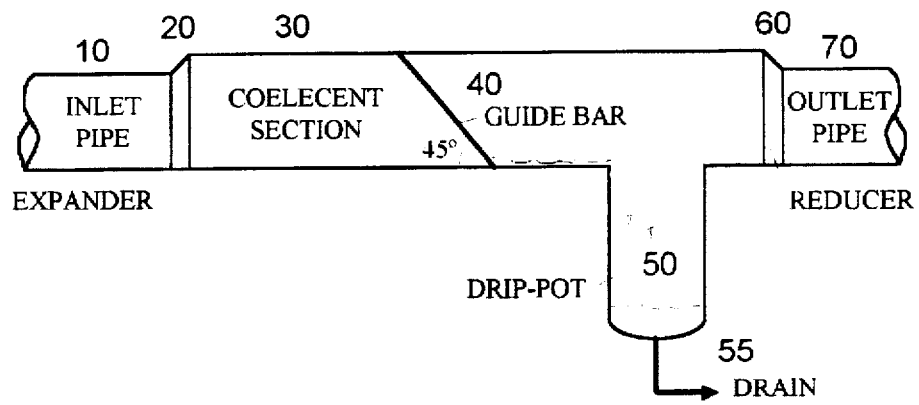
FIGS. 1 and 2 are sectional views from differing angles of the condensate drip pot.
Figure 2:
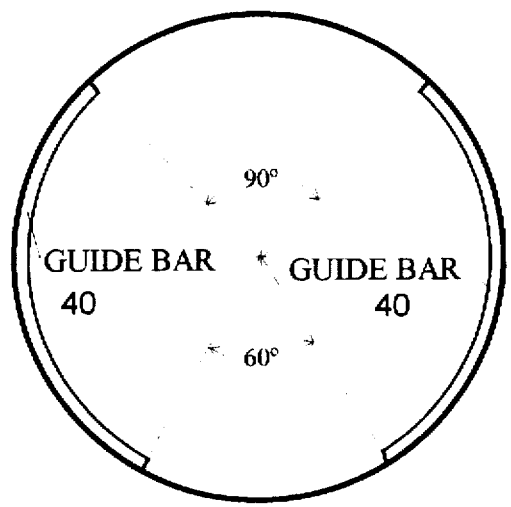

Referring to FIG. 1 the inlet flow in pipe 10 optionally expands 20 to a larger diameter pipe 30 to facilitate stratification. A coalescent liquid film build-up on the pipe wall develops and is guided 40 to the bottom of the bottom of the pipe where the fluid channels and falls into the drain pot located approximately ⅔ pipe diameter downstream from the guides 40. The liquid effluent is discharged 55 and disposed The clean vapor if originally expanded can be reduced 60 and transition to pipe diameter 70 exiting the system.

Referring to FIG. 1, the inlet flow in pipe 10 carrying a vapor and entrained liquid and/or solids optionally expands 20 eccentric or concentricity to a larger diameter pipe 30 to facilitate stratification. A liquid film build-up on the pipe wall is guided 40 to the bottom of the bottom of the pipe where the fluid channels and falls into the drain pot. The guides can preferably be ½ inch diameter rods or veins of a variety of material, shapes, etc. contoured and attached to the pipe wall by a variety of means such as by welding. The angle of the guide rod or veins can vary but the preferred angle 45, is 30 degrees to the horizontal. The coverage area of the guide can vary from the pipe top to the transition bottom. However, the preferred coverage can encompass 90 degrees on the top to sixty degrees on the bottom opening allowing the effluent to drain out exit pipe. The liquid effluent is discharged 55 and disposed The clean vapor if originally expanded can be reduced 60 and transition to pipe diameter 70 exiting the system.

What is claimed in this invention and desired to be secured by the United States Letters Patents is:

1. A guide structure in a circular pipe that capable of reducing a distance requires to develop a flow regime from annular to stratified comprising:

a plurality of guide bars of various sizes and configurations being attached circumferentially to an internal circumference of said pipe, each of said guides having an upper end and a lower end, said guides being attached in a slanted orientation with said lower ends pointing downwardly and downstream of said flow; said upper ends of said guides being spaced from one another at a top of said pipe; said lower ends of said guides being spaced from one another at a bottom of said pipe to facilitate separating and draining of condensate fluid and solid from said stratified region, said guides being located in the range of about 0 to 100 plus pipe diameters from a pipe obstruction and in the range of 0 to about 5 pipe diameters upstream from a drip-pot, wherein said guides direct the condensates on a wall of said pipe downwardly.

2. Apparatus as in claim 1, wherein said guides are located in the range of 5 to 20 pipe diameters from the pipe obstruction.

3. Apparatus as in claim 1, wherein said guides are located about ⅔ pipe diameters upstream of the drip-pot.

4. A guide structure in a circular pipe that capable of reducing a distance requires to develop a flow regime from annular to stratified comprising:

at least one guide ring being attached circumferentially to an internal circumference of said pipe, said guide ring having a space defining two opposite ends; said guide ring being attached in a slanted orientation with said ends pointing downwardly and downstream of said flow; said lower ends of said guides being spaced from one another at a bottom of said pipe to facilitate separating and draining of condensate fluid and solid from said stratified region, said guides being located in the range of about 0 to 100 plus pipe diameters from a pipe obstruction and in the range of 0 to about 5 pipe diameters upstream from a drip-pot, wherein said guides direct the condensates on a wall of said pipe downwardly.

5. Apparatus as in claim 4, wherein said guide ring is located in the range of 5 to 20 pipe diameters from the pipe obstruction.

6. Apparatus as in claim 5, wherein said guide ring is located about ⅔ pipe diameters upstream of the drip-pot.

* * * * *